United States Patent [19]

Yoshifuji et al.

[11] Patent Number: 5,586,247

[45] Date of Patent: Dec. 17, 1996

[54] DATA UPDATING SYSTEM CAPABLE OF PARTIALLY RECOVERING DATA

[75] Inventors: Yuuki Yoshifuji, Tokyo; Miyuki Harashima, Kanagawa, both of Japan

[73] Assignee: NEC Corporation, Tokyo, Japan

[21] Appl. No.: 449,558

[22] Filed: May 24, 1995

[30] Foreign Application Priority Data

May 24, 1994 [JP] Japan .................................... 6-108849

[51] Int. Cl.⁶ .................................................... G06F 11/00
[52] U.S. Cl. ................ 395/181; 395/182.13; 395/182.04
[58] Field of Search .............................. 395/181, 182.03, 395/182.04, 182.13, 182.18, 182.02

[56] References Cited

U.S. PATENT DOCUMENTS

| | | | |
|---|---|---|---|
| 4,949,251 | 8/1990 | Griffin et al. | 395/182.18 |
| 4,996,687 | 2/1991 | Hess et al. | 395/182.13 |
| 5,086,502 | 2/1992 | Malcolm | 395/182.06 |
| 5,138,548 | 8/1992 | Kienle | 395/425 |
| 5,325,519 | 6/1994 | Long et al. | 395/182.06 |
| 5,384,697 | 1/1995 | Pascucci | 364/139 |

*Primary Examiner*—Robert W. Beausoliel, Jr.
*Assistant Examiner*—Ly V. Hua
*Attorney, Agent, or Firm*—Sughrue, Mion, Zinn, Macpeak & Seas

[57] ABSTRACT

A data updating system includes a current data storage unit for storing a current data. The current data includes a plurality of data rows, each of which is a set of data elements required to achieve a function. Each of the data elements is assigned with an identifier. A back-up section executes a back-up process, i.e., reads out data elements of a data row associated with an update instruction and stores it in a buffer memory. An update section overwrite new data elements designated by the update instruction on the associated data row in the storage unit in units of data elements after the back-up. When the overwrite is unsuccessful on a particular one of the new data elements, a recover section executes a recover process, i.e., reads the data elements from the buffer memory and writes them in the storage unit to recover the whole current data.

11 Claims, 6 Drawing Sheets

DATA UPDATING SYSTEM CAPABLE OF PARTIALLY RECOVERING DATA

BACKGROUND OF THE INVENTION

1. Field of the Invention

The present invention relates to a data updating system for updating sets of data internally managed by an information processing apparatus, and more particularly, to a data updating system which can recover a data element for a current data when an error is generated during the updating of the data element.

2. Description of Related Art

Conventionally, an information processing system includes a data updating system having a function for updating a data internally and a function for recovering an original data using a back-up data when a data error is generated during the updating process. Such a data updating system is shown in FIG. 1.

Figure 1:
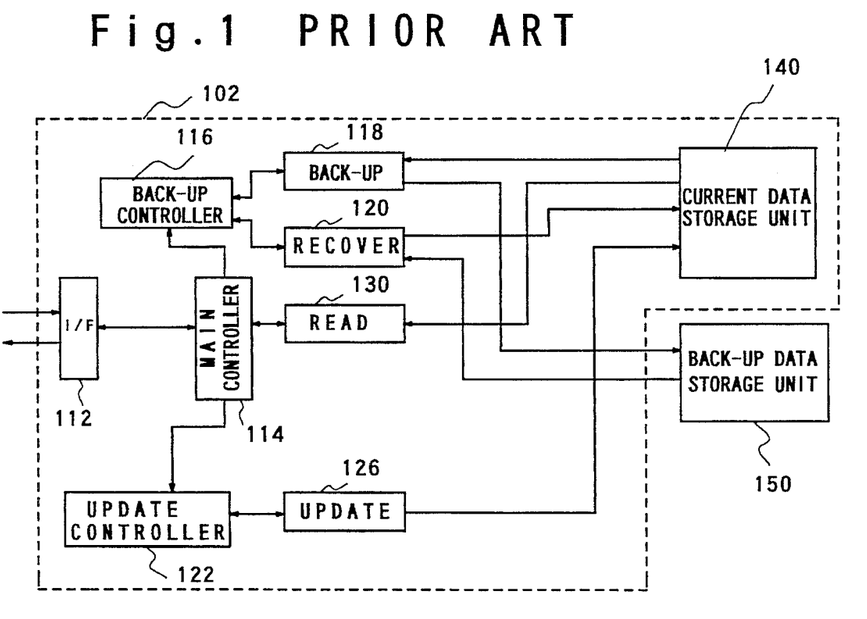
FIG. 1 is a block diagram showing a conventional data updating system.

Referring to FIG. 1, the conventional data updating system includes a data processing section 102 having a current data storage unit 140, and an external back-up data storage unit 150. The data processing section 102 includes a main controller 114. The main controller 114 is connected to an interface circuit 112, a back-up controller 116, an update controller 122 and a read section 130. The back-up controller 116 is connected to a current data back-up section 118 and a current data recover section 120. The update controller 122 is connected to a data element update section 126.

The main controller 114 includes a timer and issues a back-up instruction to the back-up controller 116 for every predetermined period of time. Also, the main controller 114 issues a recover instruction to the back-up controller 116 when a data error is found. The back-up controller 116 issues a current data back-up instruction to the current data back-up section 118. The back-up section 118 reads all the current data stored in the storage unit 140 in response to the instruction to write in the back-up data storage unit 150. The back-up controller 116 issues a current data recover instruction to the current data recover section 120. The recover section 120 reads all the back-up data stored in the storage unit 150 in response to the instruction to write in the current data storage unit 140 to recover the current data. When receiving a connection information setting request from the user by the interface circuit 112, the main controller 114 issues an update instruction to the update controller 122. The update controller 122 issues a data element back-up instruction to the data element update section 126. The data element update section 126 updates the current data stored in the storage unit 140 with new data elements designated by the data element update instruction in response to the instruction. If any data error is generated during the update processing, the data element update section 126 informs it to the main controller 114 through the update controller 122. The main controller 114 issues the recover instruction to the back-up controller 116, as described above.

In this manner, in the conventional data updating system, the whole current data needs to be recovered even if the data error is generated only in a part of the current data. Therefore, it takes a long time to recover the current data.

Further, when the data error is generated immediately before the back-up instruction is issued from the main controller 114, the recovered current data is occasionally different from the current data before the data error is generated.

SUMMARY OF THE INVENTION

It is an object of the invention to provide a method and apparatus for updating a data in which coincidence can be obtained between an original current data and a recovered current data when a data error is generated during the update.

It is a further object of the present invention to provide a method and apparatus for updating a data in which an original current data can be recovered in units of data element or data rows each including a plurality of data elements and being a data unit for achieving a function when a data error is generated during the update.

It is still another object of the present invention to provide a method and apparatus for updating a data in which a back-up data can be produced during the update without delay of read of the current data.

In order to achieve the above objects of the present invention, a method of updating data stored in a storage unit, comprising the steps of:

providing a current data in a storage unit, the current data including a plurality of data rows, each of which being a set of data elements required to achieve a function and each of the data elements being assigned with an identifier;

backing up data elements of a data row associated with an update instruction into a memory;

overwriting new data elements designated by the update instruction on the associated data row in the storage unit in units of data elements or in units of data rows after the backing up; and when the overwrite is unsuccessful on a particular one of the new data elements, writing the data element or the data row stored in the memory and corresponding to the particular data element into the storage unit to recover the whole current data.

In order to achieve other aspects of the above objects of the present invention, a data updating system includes a storage unit for storing a current data which includes a plurality of data rows, each of the plurality of data rows comprising a plurality of data elements for a plurality of data items, a memory for temporarily storing data elements, a transfer section responsive to an update instruction, for reading data elements of a data row associated with the update instruction from the storage unit to transfer to the memory, and an updating section responsive to the transfer section, for updating the data elements of the associated data row with new data elements designated by the update instruction in the storage unit in units of data elements.

The transfer section may read out the data elements of the data row associated with the update instruction, collectively in response to the update instruction or each time the updating section successfully updates one data element of the associated data row in the storage unit.

The updating section further may include a section for checking whether the update is successful. In this case, the data updating system can further include a recover section for recovering a particular data element in the storage unit based on the particular data element stored in the memory when the update of the particular data element of the associated data row is unsuccessful.

The recover section may be initiated after the updating section repeats the update a predetermined number of times until the particular data element is successfully updated.

The recovery may be performed in data element unit base or data row unit base.

When the data updating system includes a back-up storage unit for backing up the current data, a back-up storage updating section may update the back-up data with the data elements stored in the memory, or with the new data elements designated by the update instruction.

DESCRIPTION OF THE PREFERRED EMBODIMENTS

The data updating system according to the present invention will be described below with reference to the accompanying drawings.

Figure 2:
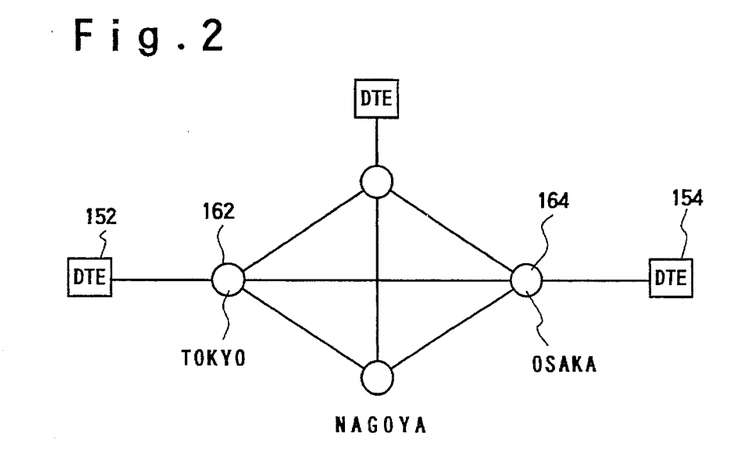
FIG. 2 is a communication network system as an example of application to which a data updating system according to the present invention is applied.

First, FIG. 2 shows a communication network system to which the data updating system of the present invention is applied. Exchange offices 162, 164 in big cities such as Tokyo and Osaka are connected to each other by lines. The data updating system according to the present invention is contained in the exchange office 162 which is located in Tokyo. It is assumed that a user requests to transmit a data from a data terminal 152 in Tokyo to another data terminal 154 in Osaka. In this case, the user needs to send to the Tokyo exchange office 162 a connection information setting request indicative of line connection between the Tokyo data terminal 152 and the Osaka data terminal 154 through the exchange offices 162 and 164 and a connection request. The connection information setting request would include various data items such as a source name, a source exchange office, a destination exchange office, and a destination name.

Figure 3:
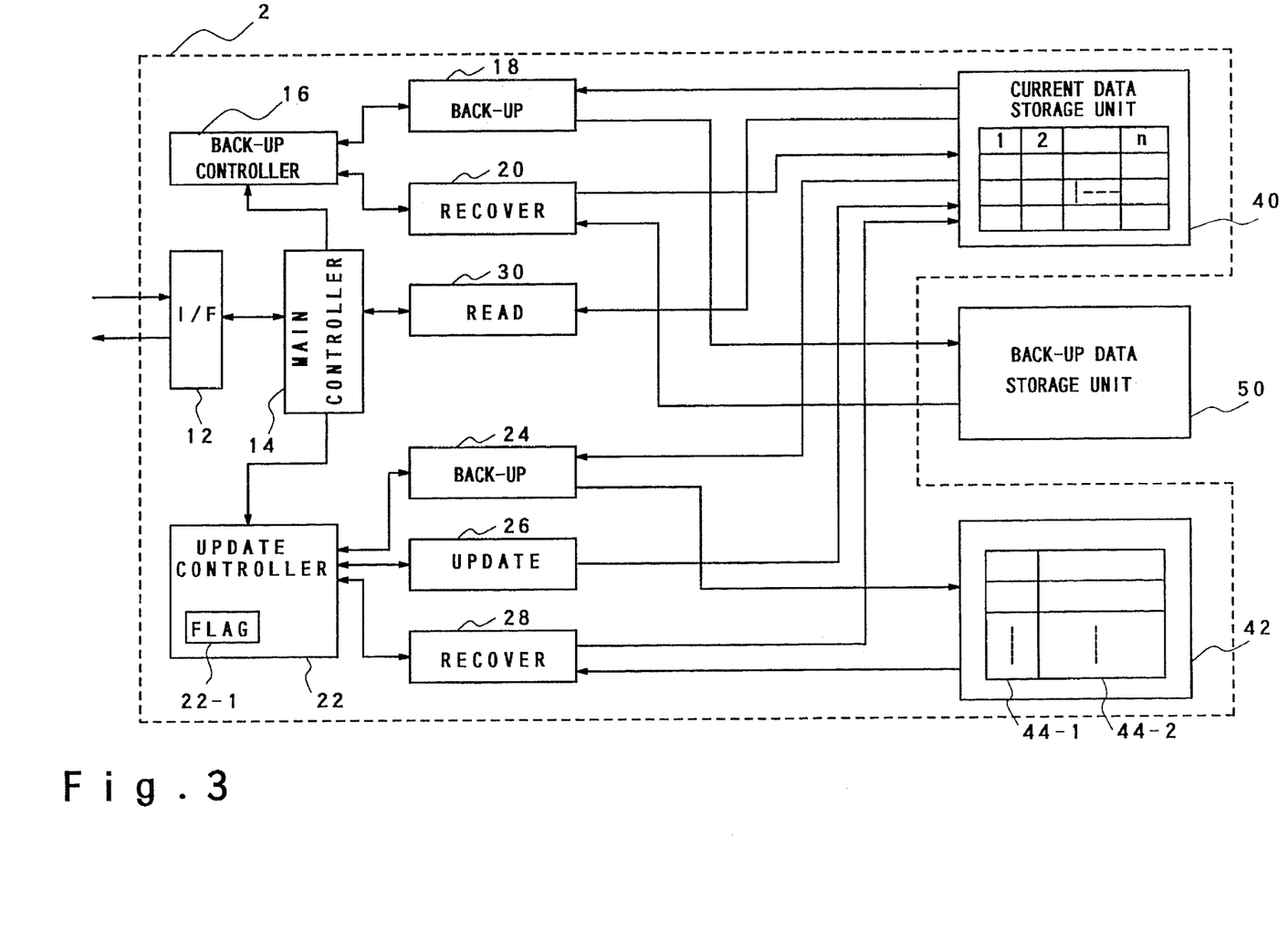
FIG. 3 is a block diagram showing the data updating system according to a first embodiment of the present invention.

Next, the data updating system according to an embodiment of the present invention will be described. The data updating system includes a data processing section 2 in which a current data storage unit 40 and a temporary buffer memory 42 are incorporated, and an external back-up data storage unit 50. The storage units 40 and 50 are composed of hard disk apparatuses, respectively. It would be appreciated by a person skilled in the art that the operation speed of the storage unit 40 is faster than that of the storage unit 50 because the storage unit 40 is incorporated in the data processing section 2. The buffer memory 42 is composed of a dynamic random access memory (DRAM) backed up with battery. The data processing section 2 includes a main controller 14 other than the current data storage unit 40 and the buffer memory 42. The main controller 14 is connected to an interface circuit 12 for communication, a current data row read section 30, a back-up controller 16 and an update controller 22 having a flag 22-1. The back-up controller 16 is connected to a current data back-up section 18 and a current data recover section 20. The update controller 22 is connected to a data element back-up section 24, a data element update section 26, and a data row recover section 28. The current data back-up section 18 and current data recover section 20 are both connected to the current data storage unit 40 and the back-up data storage unit 50. The current data row read section 30 is connected only to the current data storage unit 40. The data element back-up section 24 and data row recover section 28 are both connected to the current data storage unit 40 and the buffer memory 42. The data element update section 26 is connected to the current data storage unit 40.

Next, the operation of the data updating system according to the embodiment of the present invention will be described below.

The current data stored in the storage unit 40 is composed of a plurality of data rows each corresponding to a channel. If a plurality of time slots are time division multiplexed on the channel, each of the data rows corresponds to one time slot. Each data row is composed of a plurality of data elements respectively corresponding to a plurality of data items such as a source station name, a source exchange office, a destination exchange office, and a destination station name. Each of the data elements is assigned with an identifier and can be accessed using the identifier.

The main controller 14 includes a timer and issues a back-up instruction to the back-up controller 16 for every predetermined period of time. The back-up controller 16 issues a current data back-up instruction to the current data back-up section 18. The back-up section 18 reads all the current data stored in the storage unit 40 in response to the instruction to write in the back-up data storage unit 50. When receiving information indicating that the current data is destroyed, the main controller 14 issues a recover instruction to the back-up controller 16 which in turn issues a current data recover instruction to the current data recover section 20. The recover section 20 reads all the back-up data stored in the storage unit 50 in response to the instruction to write it as the current data in the current data storage unit 40.

When a connection information setting request from the user is received by the main controller 14 through the interface circuit 12, the operation of the data updating system is as follows.

Figure 4:
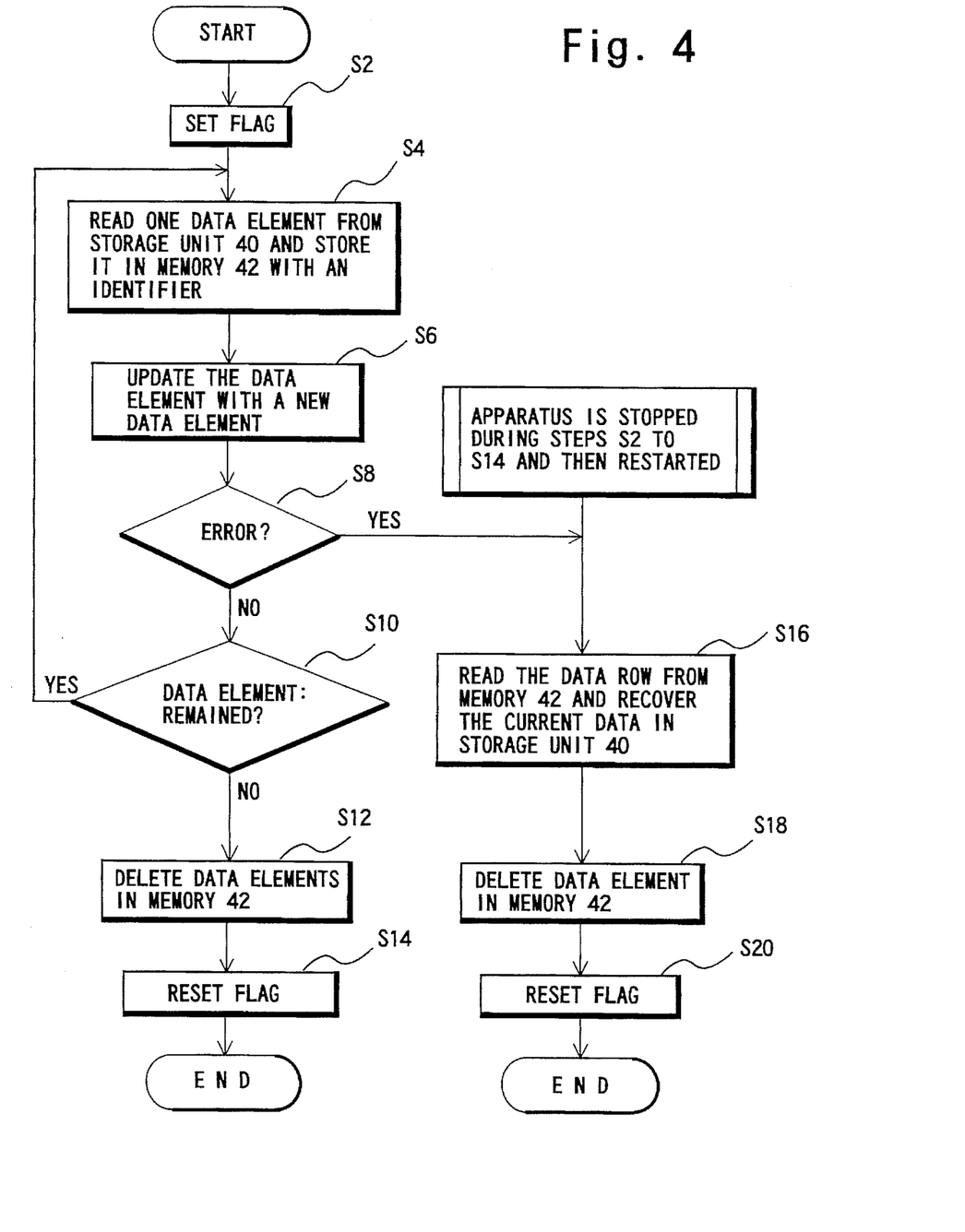
FIG. 4 is a flow chart for explaining an operation of the data updating system according to the first embodiment of the present invention.

In a step S2, when receiving the connection information setting request from the user by the interface circuit 12, the main controller 14 checks whether the flag 22-1 is set. When the flag 22-1 is set, the main controller 14 does not return an acknowledgement to the user terminal which has issued the connection information setting request. Therefore, the user cannot continue the operation and must instead wait for the acknowledgement. When the flag 22-1 is not set, the main controller 14 issues an update instruction to the update controller 22. The update controller 22 sets the flag 22-1 and issues a data element back-up instruction with an identifier associated with the request to the data element back-up section 24.

In a step S4, the data element back-up section 24 reads out a data element of the first data item of a data row associated with the connection information setting request from the current data storage unit 40 based on the identifier in response to the data element back-up instruction and stores it in the buffer memory 42 at a field 44-2 of the first memory location. At the same time, an identifier for the data element is stored in a field 44-1 of the first memory location. Completion of the above back-up operation is informed to the update controller 22.

In a step S6, the update controller 22 issues to the data element update section 26 a data element update instruction with a new data element which is designated by the connection information setting request, and the identifier. The data element update section 26 updates the current data stored in the storage unit 40 with the new data element based on the identifier in response to the data element update instruction. Then, in a step S8, the update section 26 reads the updated data element from the storage unit 40 and compares the updated data element with the designated data element to determine whether the update operation is successfully completed. If both of the data elements are coincident with each other, the update operation is successful and the control proceeds to the next step S10. If both of the data elements are not coincident, it is determined that a data error is generated during the update process and the control proceeds to a step S16. The determining result is informed to the update controller 22.

In the step S10, any remaining data item designated by the connection information setting request but not yet processed is checked by the update controller 22. If the answer is affirmative, the control returns to the step S4 to execute the steps S4 through S8 for the remaining data elements. In this case, a data element for the second data item is stored in the buffer memory 42 at the second memory location and so on. If the answer is negative, it means that the update of all the data elements designated by the connection information setting request is successfully completed and the control proceeds to a step S12.

In the step S12, the data elements stored in the buffer memory 42 are all cleared by the update controller 22. Then, the update controller 22 resets the flag 22-1 and informs the main controller 14 that the update processing for the connection information setting request is completed. The main controller 14 issues an acknowledgement to the user terminal. As a result, the user terminal is allowed to issue another request such as a channel use request.

When the answer is affirmative in the step S8 or when the system down occurs during the steps S2 through S14, the step S16 is executed. In the step S16, a data element recover instruction is issued from the update controller 22 to the data row recover section 28. The recover section 28 reads the data elements for the data item in which the coincidence is not obtained (i.e., reading the data row from the buffer memory 42) and writes the data row in the current data storage unit 40 in response to the data element recover instruction. Then, the recover section 28 informs the completion of the data row recovery to the update controller 22.

The update controller 22 clears the data elements stored in the buffer memory 42 and resets the flag S20, as in the steps S12 and S14.

In this manner, the current data is updated and recovered.

Thereafter, when a channel use request is inputted from the user terminal, the main controller 14 issues a data row read instruction to the read section 30. The read section 30 reads a data row designated by the channel use request and transfers it to the main controller 14. The main controller 14 controls the channel connection based on the row data read out by the read section 30.

In the above embodiment, when any error is generated so that a data element of the current data is destroyed, the whole current data needs not to be recovered from the back-up data stored in the back-up data storage unit 50. Only a data row including the data element is sufficient to be recovered. Therefore, the recovery process can be performed with a shorter time. In addition, the data rows of the current data other than the data row including the error data element is not changed. Therefore, reliability of the whole current data can be increased.

Further, the data elements in the data row designated by the connection information setting request are read out from the current data storage unit 40 one by one in step S2. However, the data row may be read out once so that the data elements are stored in the different memory locations. In this case, the control returns from step S10 to step S6 instead of step S4.

In addition, the data row is recovered by the recover section 28 when any error is found in the above embodiment. However, the recover process may be performed in units of data elements.

Figure 5:
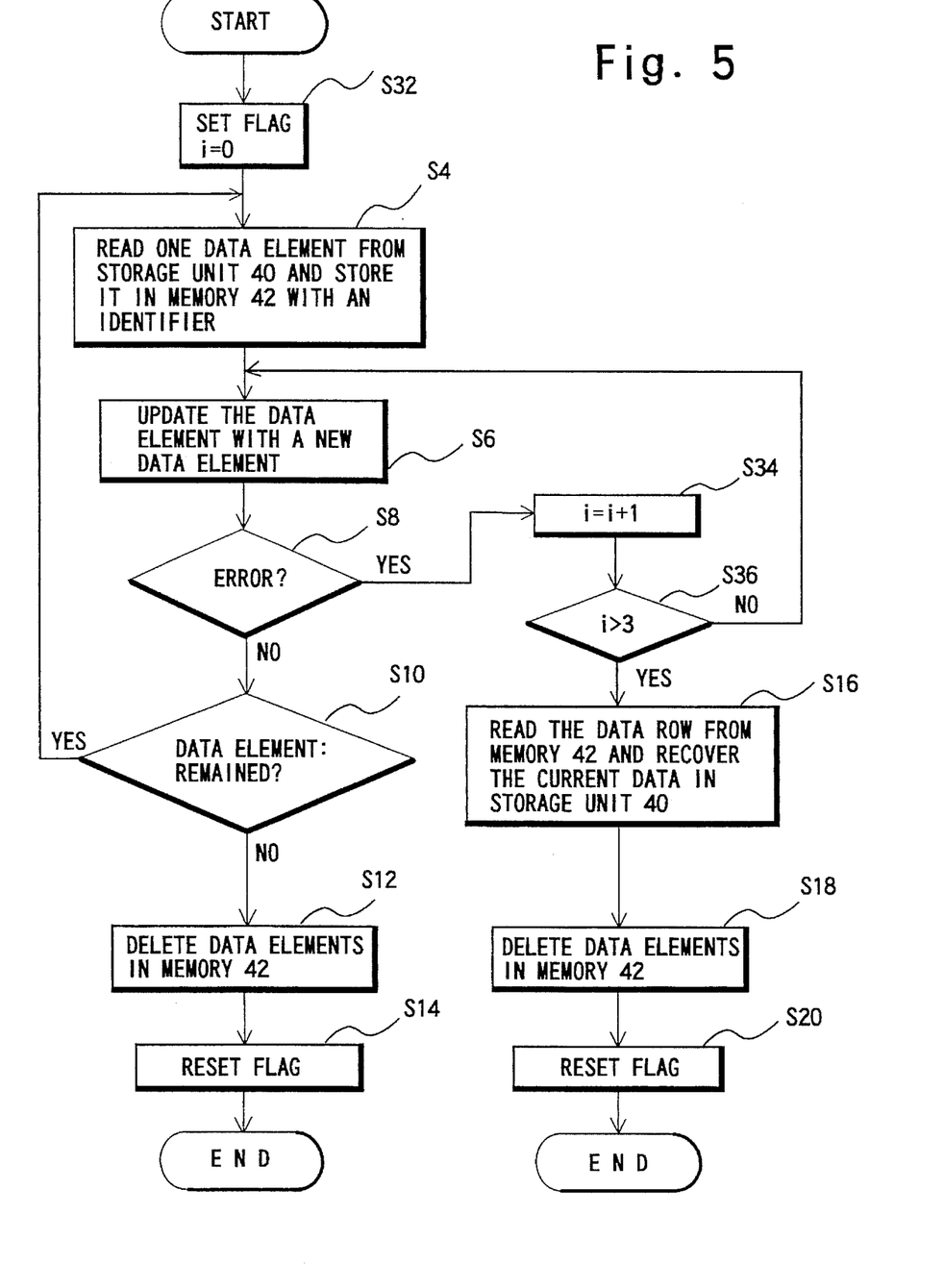
FIG. 5 is a flow chart for explaining another operation of the data updating system according to the first embodiment.

Next, a modification of the data updating system will be described below with reference to FIG. 5. In step S32, which is basically similar to the step S2, when receiving the connection information setting request from the user through the user terminal by the interface circuit 12, the main controller 14 checks whether the flag 22-1 is set. When the flag 22-1 is set, the user terminal cannot continue the process and must wait for the acknowledgement from the main controller 14 through the interface circuit 12. When the flag 22-1 is not set, the main controller 14 issues the update instruction to the update controller 22. The update controller 22 sets the flag 22-1 and a variable i=0. Then the update controller 22 issues a data element back-up instruction with an identifier associated with the instruction to the data element back-up section 24.

In the step S4, the data element back-up section 24 reads out a data element of the first data item of a data row associated with the connection information setting request from the current data storage unit 40 based on the identifier in response to the data element back-up instruction and stores it in the buffer memory 42 at the field 44-2 of the first memory location. At the same time, an identifier for the data element is stored in the field 44-1 of the first memory location. Completion of the above back-up operation is informed to the update controller 22.

In the step S6, the update controller 22 issues to the data element update section 26 a data element update instruction with a new data element which is designated by the connection information setting request, and the identifier. The data element update section 26 updates the current data stored in the storage unit 40 with the new data element based on the identifier in response to the data element update instruction. Then, in the step S8, the update section 26 reads the updated data element from the storage unit 40 and compares the updated data element with the designated data element to determine whether the update operation is successfully completed. The determining result is sent to the update controller 22. If both of the data elements are coincident with each other, the update operation is successful and the control proceeds to the next step S10. If both of the data elements are not coincident, then a data error is generated and the control goes to a step S34. In the step S34, the variable i is incremented by one, i.e., i=i+1 is executed. Then, in a step S36, whether a relation i>3 is satisfied is checked. If the relation is not satisfied, the control goes back to the step S6 to update the data element with the new data element again. That is, the update process can be repeated three times. If the relation is satisfied, the update process is stopped and the control goes to the step S16. The subsequent steps are the same as in the above embodiment.

Next, the data updating system according to the second embodiment of the present invention will be described below with reference to FIGS. 6 and 7.

Figure 6:
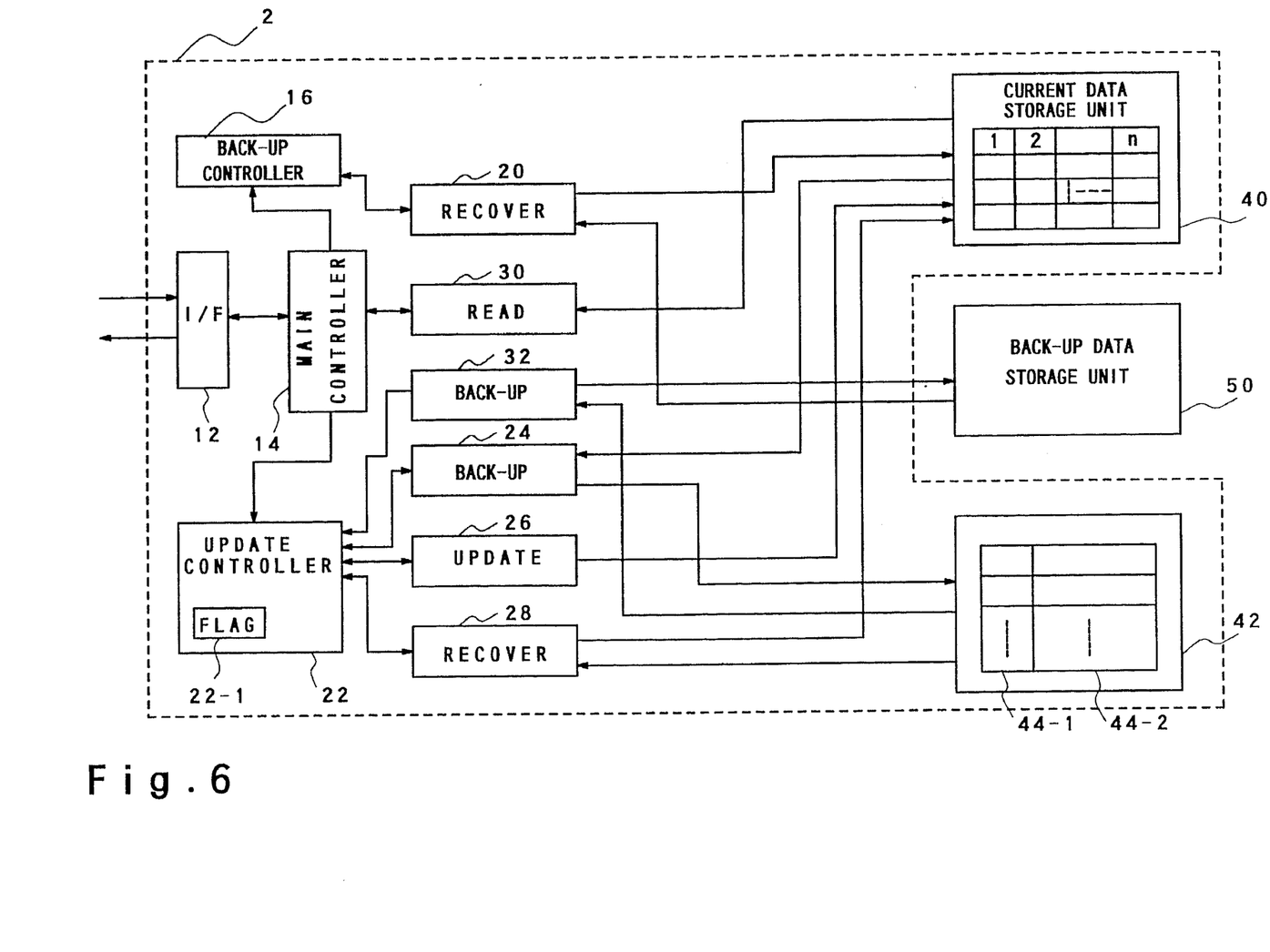
FIG. 6 is a block diagram showing the data updating system according to a second embodiment of the present invention.
Figure 7:
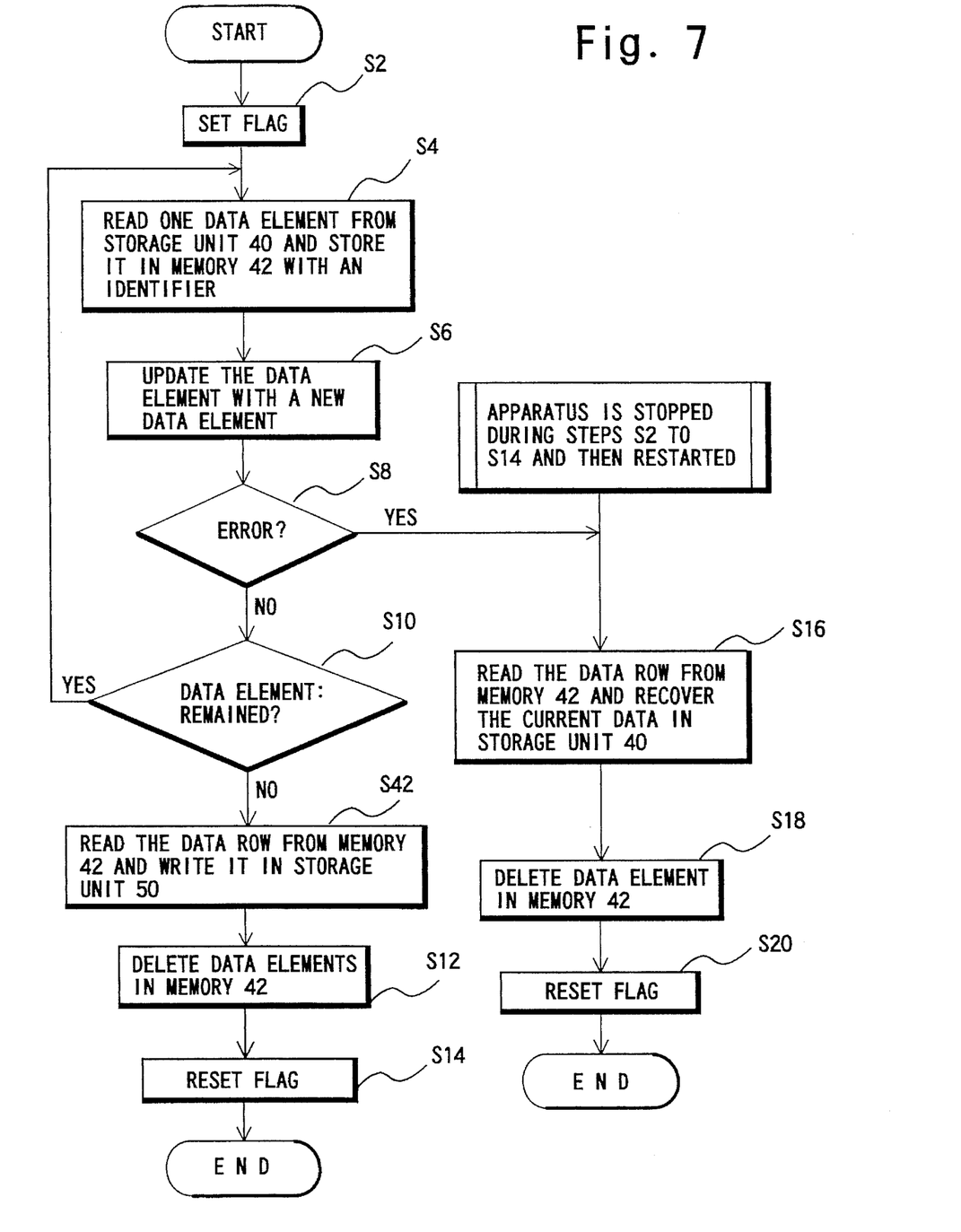
FIG. 7 is a flow chart for explaining an operation of the data updating system according to the second embodiment of the present invention.

Referring to FIG. 6, the structure of the data updating system will be described. In the structure, the current data back-up section 28 is removed from the structure shown in FIG. 3 and a data row back-up section 32 is added to the structure shown in FIG. 3.

Next, the operation of the data updating system according to the second embodiment will be described. The steps S2 through S10 are the same as in the FIG. 4. When it is determined in the step S10 that all the data elements designated by the update instruction are successfully updated, the update controller 22 issues a data row back-up instruction to the data row back-up section 32. The back-up section 32 reads out the data row stored in the buffer memory 42 and writes the same in the back-up data storage unit 50. Thus, the back-up data stored in the storage unit 50 can be updated. Therefore, even if the whole current data stored in the storage unit 40 is destroyed, the current data immediate before the connection information setting request is input can be recovered. Subsequently, the steps S12 and S14 are executed, as shown in the FIG. 4.

In the above embodiment, the data row back-up section 32 is independent of the data row read section 30. If the main controller 14 includes a queue for requests from the user, the main controller can sequentially executes the requests. Thus, even if the main controller 14 can receive from the update controller 22 a notice indicative of completion of the update processing in the step S10, the main controller 14 can executes a next request to the above connection information setting request. In this case, if the next request is a channel use request, the main controller 14 directly controls the current data row read section 30 to read out a data row from the current data storage unit 40. On the other hand, since the back-up section 32 does not access the storage unit 40, the write operation of the data row stored in the buffer memory 42 into the back-up data storage unit 50 can be performed independently of the read section 30. In this manner, in this embodiment, the current back-up section can be removed and the back-up data of the current data can be stored in the storage unit 50 without suspending the next request.

In the above embodiment, the back-up section 32 reads out the data row from the buffer memory 42 and writes it into the storage unit 50. However, the write operation may be performed in units of data elements. In addition, the new data elements or data row designated by the connection information setting request may be written in the storage unit 50. In this case, the back-up data is truly a duplicate of the current data.

What is claimed is:

1. A data updating system comprising:

storage means for storing a current data which includes a plurality of data rows, each of the plurality of data rows has a plurality of data elements corresponding to a plurality of data items;

buffer memory means for temporarily storing a plurality of data elements associated with an update instruction;

transfer means responsive to the update instruction, for reading and transferring data elements of a data row associated with the update instruction from said storage means to said buffer memory means; and updating means responsive to said transfer means, for updating at least one of said data elements of said associated data row with at least one of new data elements designated by the update instruction in said storage means.

2. A data updating system according to claim 1, wherein said updating means further comprises means for checking whether the update is successful, and wherein said data updating system further comprises recovery means for recovering a particular data element in said storage means based on the particular data element stored in said buffer memory means when the update of the particular data element is unsuccessful.

3. A data updating system according to claim 2, wherein said transfer means reads out one of the data elements of the data row associated with the update instruction each time said updating means successfully updates one of the data elements of the associated data row in said storage means.

4. A data updating system according to claim 2, further comprising repetition means for causing said updating means to repeat the update a predetermined number of times until the particular data element is successfully updated.

5. A data updating system according to claim 1, further comprising:

back-up storage means for storing a back-up data of the current data; and back-up storage updating means for updating the back-up data with the data elements stored in said buffer memory means.

6. A data updating system according to claim 1, further comprising:

back-up storage means for storing a back-up data of the current data; and back-up storage updating means for updating the backup data with the new data elements designated by the update instruction.

7. A method of updating data stored in a storage unit, comprising the steps of:

providing a current data comprising a plurality of data rows in a storage unit, each of the plurality of data rows being a set of data elements required to achieve a function and each of the data elements being assigned with an identifier;

temporarily backing up data elements of a data row associated with an update instruction into a buffer memory;

overwriting data elements designated by the update instruction on the associated data row in said storage unit with the data element after the backing up; and when the overwrite is unsuccessful on a particular one of the data elements, rewriting the data element stored in the buffer memory into said storage unit to recover the current data.

8. A method according to claim 7, wherein said backing up step includes reading out the data elements of the associated data row from said storage unit one by one to store in the memory each time said overwriting is successfully performed.

9. A method according to claim 7, further comprising the steps of repeating said overwriting step a predetermined number of times until the particular data element is successfully overwritten when the first overwriting is unsuccessful.

10. A method according to claim 7, further comprising the step of updating a duplicate of the current data with each of the data elements stored in said memory.

11. A method according to claim 7, further comprising the step of updating a duplicate of the current data with the new data row designated by the update instruction.

* * * * *